(12) United States Patent
Carmeli et al.

(10) Patent No.: US 7,613,115 B2
(45) Date of Patent: Nov. 3, 2009

(54) MINIMAL DELAY TRANSMISSION OF SHORT MESSAGES

(75) Inventors: Boaz Carmeli, Kornit (IL); John Justin Duigenan, Bournemouth (GB); Gidon Gershinsky, Haifa (IL); Haim Nelken, Haifa (IL); Julian Satran, Atlit (IL)

(73) Assignee: International Business Machines Corporation, Armonk, NY (US)

( * ) Notice: Subject to any disclaimer, the term of this patent is extended or adjusted under 35 U.S.C. 154(b) by 773 days.

(21) Appl. No.: 10/699,081

(22) Filed: Oct. 31, 2003

(65) Prior Publication Data

US 2005/0097158 A1  May 5, 2005

(51) Int. Cl.
*H04J 3/14* (2006.01)
(52) U.S. Cl. ................. 370/235; 370/230; 370/537
(58) Field of Classification Search ............. 370/230, 370/230.1, 231, 232, 233, 234, 235, 236, 370/516, 537, 538, 540
See application file for complete search history.

(56) References Cited

U.S. PATENT DOCUMENTS

| | | | | |
|---|---|---|---|---|
| 4,536,877 A * | 8/1985 | Livingston et al. | ........... | 714/749 |
| 4,914,650 A * | 4/1990 | Sriram | ........... | 370/235 |
| 5,260,942 A | 11/1993 | Auerbach et al. | | |
| 5,649,110 A * | 7/1997 | Ben-Nun et al. | ........... | 370/351 |
| 5,737,314 A * | 4/1998 | Hatono et al. | ........... | 370/235 |
| 6,064,650 A * | 5/2000 | Kappler et al. | ........... | 370/232 |
| 6,212,206 B1 * | 4/2001 | Ketcham | ........... | 370/516 |
| 6,215,769 B1 * | 4/2001 | Ghani et al. | ........... | 370/230 |
| 6,519,254 B1 * | 2/2003 | Chuah et al. | ........... | 370/389 |
| 6,538,992 B1 * | 3/2003 | Subbiah et al. | ........... | 370/230 |
| 6,618,378 B1 * | 9/2003 | Giroux et al. | ........... | 370/395.1 |
| 6,678,248 B1 * | 1/2004 | Haddock et al. | ........... | 370/235 |
| 6,704,321 B1 * | 3/2004 | Kamiya | ........... | 370/412 |
| 6,721,334 B1 * | 4/2004 | Ketcham | ........... | 370/473 |
| 6,826,147 B1 * | 11/2004 | Nandy et al. | ........... | 370/229 |
| 6,834,053 B1 * | 12/2004 | Stacey et al. | ........... | 370/395.4 |
| 6,882,642 B1 * | 4/2005 | Kejriwal et al. | ........... | 370/388 |
| 7,158,527 B2 * | 1/2007 | Malomsoky et al. | ........... | 370/414 |
| 7,161,902 B2 * | 1/2007 | Carter et al. | ........... | 370/229 |
| 7,257,083 B2 * | 8/2007 | Bansal et al. | ........... | 370/235 |
| 7,369,491 B1 * | 5/2008 | Beshai et al. | ........... | 370/230 |
| 7,391,769 B2 * | 6/2008 | Rajkumar et al. | ........... | 370/389 |
| 7,409,460 B1 * | 8/2008 | Li | ........... | 709/240 |
| 7,453,804 B1 * | 11/2008 | Feroz et al. | ........... | 370/230 |
| 7,460,524 B2 * | 12/2008 | Khan | ........... | 370/353 |
| 2002/0118692 A1 * | 8/2002 | Oberman et al. | ........... | 370/419 |
| 2002/0141425 A1 * | 10/2002 | Merani et al. | ........... | 370/412 |
| 2002/0145974 A1 * | 10/2002 | Saidi et al. | ........... | 370/230 |
| 2003/0231593 A1 * | 12/2003 | Bauman et al. | ........... | 370/235 |

(Continued)

OTHER PUBLICATIONS

Narasimhan, P. et al., "Message Packing as a Performance Enhancement Strategy with Application to the Totem Protocols," 0-7803-3336-5/96 © 1996 IEEE; pp. 649-653.

*Primary Examiner*—Chi H. Pham
*Assistant Examiner*—Kevin Mew

(57) ABSTRACT

A transmission method adjusts the size of aggregated packets based at least on the congestion of a transmitting network device. The adjusting comprises includes aggregating at least two small messages, received from an upper layer, into a packet, providing the packet to a pending queue, passing packets to a network device and selecting packets from the pending queue or the buffer depending on whether or not the pending queue is empty.

7 Claims, 3 Drawing Sheets

U.S. PATENT DOCUMENTS

| | | | |
|---|---|---|---|
| 2004/0090988 A1* | 5/2004 | Masputra et al. | 370/469 |
| 2004/0170125 A1* | 9/2004 | O'Neill | 370/230 |
| 2004/0248583 A1* | 12/2004 | Satt et al. | 455/452.2 |
| 2006/0259542 A1* | 11/2006 | Wu et al. | 709/202 |
| 2009/0073884 A1* | 3/2009 | Kodama et al. | 370/235 |

* cited by examiner

MINIMAL DELAY TRANSMISSION OF SHORT MESSAGES

FIELD OF THE INVENTION

The present invention relates generally to transmission of short messages on a data network and to minimal delay therein in particular.

BACKGROUND OF THE INVENTION

Data networks, like the Internet or any intranet, are well known. Sending short messages at high rates on data networks causes inefficient utilization of end-to-end network resources. The processor on the transmitting end performs a fixed amount of processing work for each message irrespective of the length of the message. The same is true for the Network Interface Card (NIC) of the transmitting unit. The receiver end behaves the same way. The longer the message is, the fewer the resources consumed by the receiver, per unit length.

One known solution is to aggregate short messages into large bundles and to transmit each bundle as a single packet. Unfortunately, to do so, the transmitter must wait until enough short messages accumulate before transmitting the bundle. This can cause unacceptable delays at the receiver.

SUMMARY OF THE INVENTION

There is therefore provided, in accordance with a preferred embodiment of the present invention, a transmission unit including an aggregation unit and a fireout unit. The aggregation unit aggregates in a buffer at least two small messages received from an upper layer into a data packet and to provide the packet to a pending queue. The fireout unit passes packets to a network device by selecting packets from the pending queue or the buffer depending on whether or not the pending queue is empty.

Additionally, in accordance with a preferred embodiment of the present invention, the unit also includes a reception monitor to indicate to the fireout unit the status of reception of the packets.

Moreover, in accordance with a preferred embodiment of the present invention, the fireout unit operates at a rate related to network congestion.

Further, in accordance with a preferred embodiment of the present invention, the network congestion may be transmitter congestion, receiver congestion or congestion of network elements.

There is also provided, in accordance with a preferred embodiment of the present invention, a transmission unit including a transmitting network device and a unit for adjusting the size of aggregated data packets produced by the network device based at least on network congestion.

Moreover, in accordance with a preferred embodiment of the present invention, the unit for adjusting includes the aggregation unit and fireout unit described hereinabove.

Further, in accordance with a preferred embodiment of the present invention, the transmission unit also includes a reception monitor to indicate to the fireout unit the status of reception of the packets.

There is also provided, in accordance with a preferred embodiment of the present invention, a software product including a computer usable medium having computer readable program code unit embodied therein for causing transmission of packets to a network. The computer readable program code unit in the software product includes a computer readable program code unit for causing a computer to aggregate in a buffer at least two small messages received from an upper layer into a data packet and to provide the packet to a pending queue and a computer readable program code unit for causing the computer to pass packets to a network drive, selecting them from the pending queue or the buffer depending on whether or not the pending queue is empty.

Moreover, in accordance with a preferred embodiment of the present invention, the product includes a code unit for causing a computer to indicate to the second code unit the status of reception of the packets.

Further, in accordance with a preferred embodiment of the present invention, the second code unit operates at a rate related to network congestion.

There is also provided, in accordance with a preferred embodiment of the present invention, a method including adjusting the size of aggregated data packets based at least on the congestion of a transmitting network device.

Moreover, in accordance with a preferred embodiment of the present invention, the adjusting includes aggregating in a buffer at least two small messages received from an upper layer into a data packet, providing the packet to a pending queue passing the packets to a network device and selecting the packets from the pending queue or the buffer depending on whether or not the pending queue is empty.

Further, in accordance with a preferred embodiment of the present invention, the method includes indicating the status of reception of the packets.

Still further, in accordance with a preferred embodiment of the present invention, the passing operates at a rate related to network congestion.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1A:
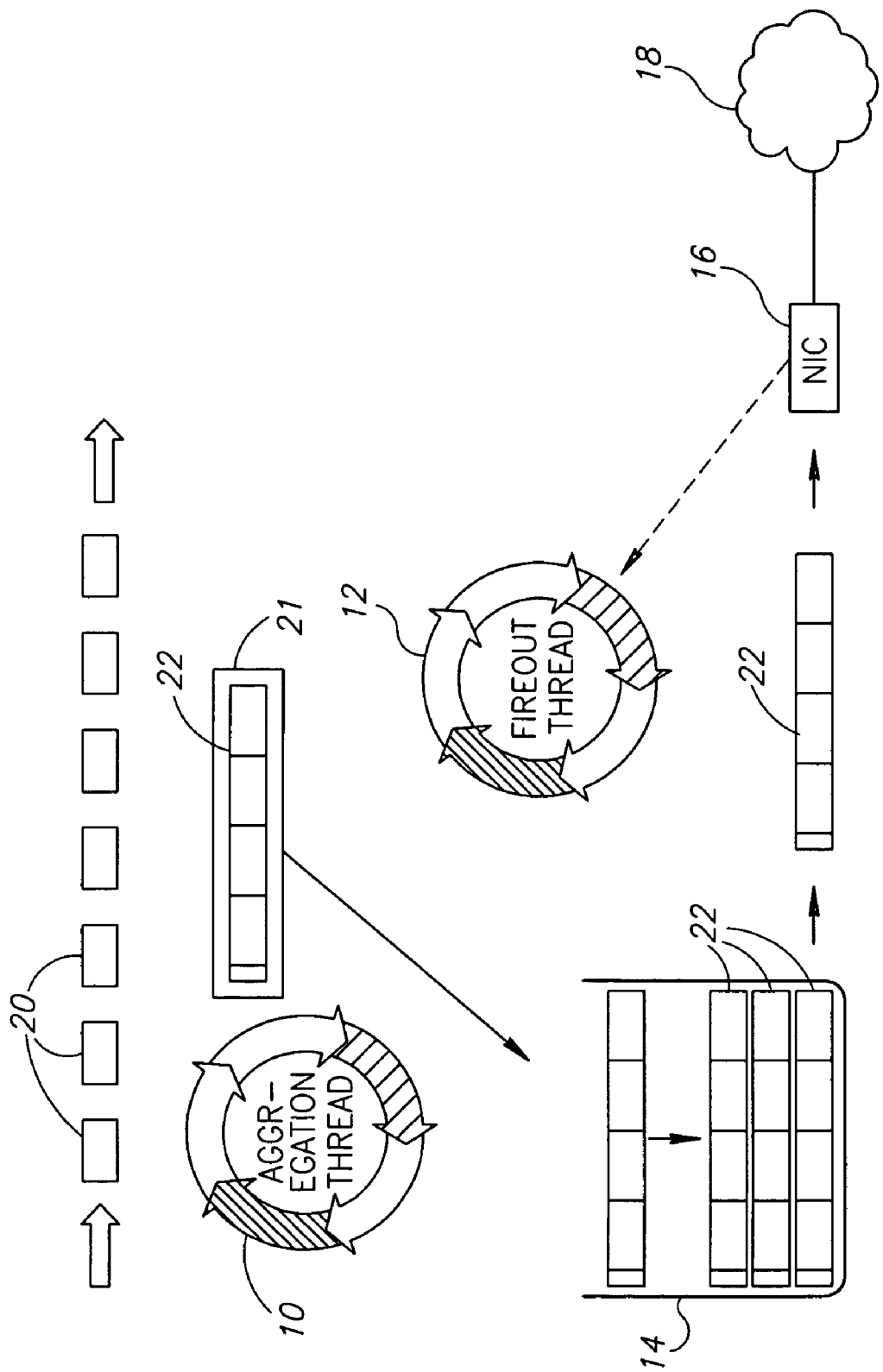
FIGS. 1A and 1B are schematic illustrations of a transmission system and method, constructed and operative in accordance with the present invention, in two states, high submission rates and low submission rates, respectively.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Figure 1B:
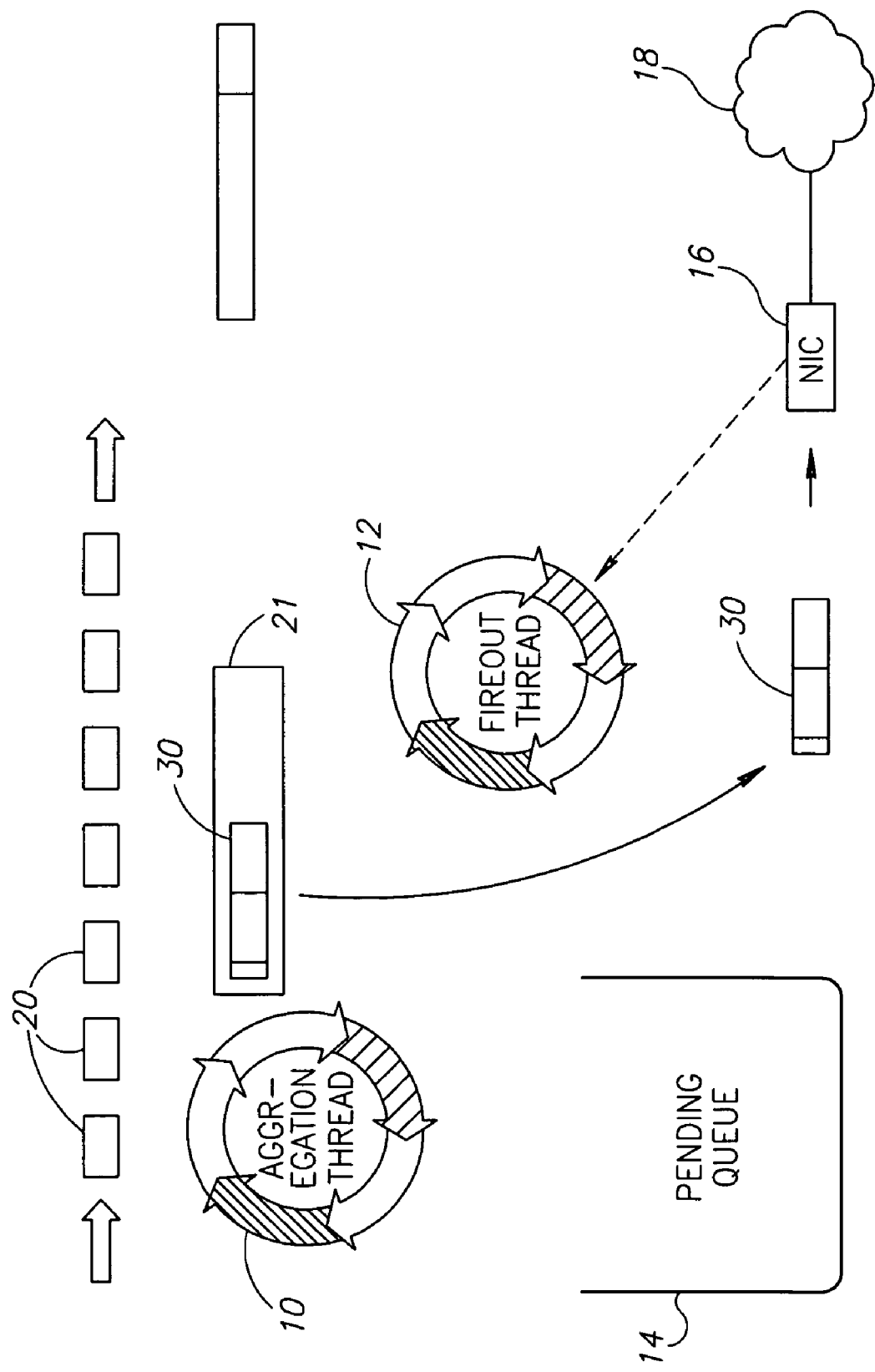

Reference is now made to FIGS. 1A and 1B, which, together, illustrate a transmission protocol and network elements to minimize packet delay due to short messages. In the embodiment of FIGS. 1A and 1B, a multi-threaded architecture is shown, having an aggregation thread 10 and a fireout thread 12. Threads 10 and 12 may operate in conjunction with a pending queue 14 and a network interface card (NIC) 16, where the latter interfaces with a network 18.

As shown in FIG. 1A, aggregation thread 10 may receive short messages 20 from an application or "upper layer" (not shown) and, utilizing a buffer 21, may aggregate a group of them into a packet 22, where each packet may contain N short messages 20. N may be any suitable number, such as at least one and preferably, significantly more than one. Aggregation thread 10 may then transfer insert aggregated packet 22 from buffer 21 into pending queue 14. Pending queue 14 may be a shared queue which may store packets 22 to be transmitted.

Fireout thread 12 may remove packets 22 from queue 14 and may pass them on to NIC 16, which, in turn may transmit them to network 18. Fireout thread 12 may respond to the activity of NIC 16 and may change its operation as a result, either speeding up or slowing down as relevant. In an example, when NIC 16 may be unable to transmit the messages in its buffer, fireout thread 12 may stop transferring messages to it.

In effect, fireout thread 12 may change its operation as a function of network congestion, where "network congestion" may mean transmitter congestion (from the operating system's network stack and/or interface card), receiver congestion and/or congestion of the network elements (like routers and switches) between the two. If the upper layer may produce short messages 20 at a slow rate, as shown in FIG. 1B, aggregation thread 10 may fill pending queue 14 more slowly and pending queue 14 may clear out. Fireout thread 12 may monitor the state of pending queue 14 and, when there are no more packets in pending queue 14, may remove the partial packet, labeled 30, from buffer 21. Fireout thread 12 may then pass partial packet 30 to NIC 16 for transmission. This may reduce the delay caused by aggregation thread 10 to zero. With aggregation thread 10 doing little, if any, aggregation, the network resources may not be efficiently utilized. However, the low submission rate from the upper layer may imply that the network may not currently be working at high utilization in any case and therefore, the resources may be utilized less efficiently without causing congestion.

At high submission rates, as shown in FIG. 1A, NIC 16 may be congested which may cause fireout thread 12 to be delayed. Pending queue 14 may fill up with large packets. These larger packets may result in better end-to-end network resource utilization, in a higher transmission rate and may reduce the congestion at NIC 16 and on network 18.

Figure 2:
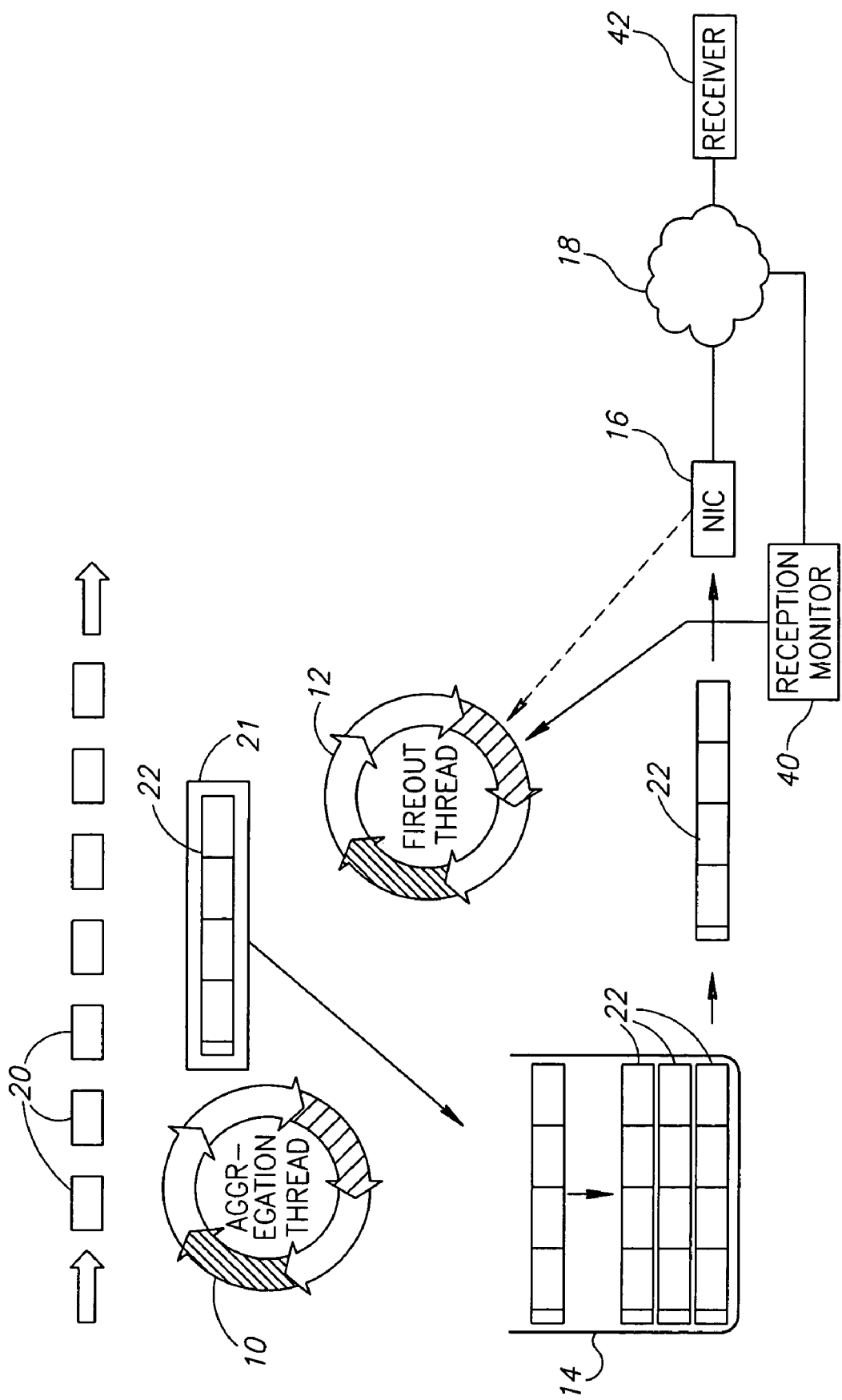
FIG. 2 is a schematic illustration of a transmission system and method, constructed and operative in accordance with an alternative embodiment of the present invention.

Reference is now made to FIG. 2, which illustrates an alternative embodiment of the present invention in which a response from the receiver may also be utilized to affect the operation of fireout thread 12. Similar reference numerals may refer to similar elements.

FIG. 2 may include the elements of FIGS. 1A and 1B with the addition of a reception monitor 40 monitoring transmissions from a receiver 42 with whom the transmitter may be communicating. Reception monitor 40 may be any suitable reception monitor such as are common in transmitters for determining whether or not receiver 42 received a particular packet. One common protocol that reception monitor 40 may perform may be the ACK protocol, wherein receiver 42 may acknowledge each packet as it may receive it. Another protocol may be the NACK protocol, wherein receiver 42 may only transmit a signal when it does not receive an expected packet. Other protocols exist and may be utilized by reception monitor 40.

In the present invention, monitor 40 may indicate to fireout thread 12 whenever receiver 42 may indicate that it is having reception trouble. This may be trouble keeping up with the transmissions of NIC 16 or whenever it appears that the network is having trouble transmitting the messages to receiver 42. Fireout thread 12 may then become slower, giving aggregation thread 10 more time to fill up packets. This may eventually make transmission and reception more efficient.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for a transmitting network device to minimally delay transmission of short messages, the method comprising:

adjusting the size of aggregated data packets based at least on the congestion of said transmitting network device, and transmitting partially aggregated data packets when said transmitting network device has no fully aggregated packets waiting to be transmitted and wherein said adjusting comprises:

aggregating in a buffer at least two small messages received from an upper layer into a packet;

providing fully aggregated packets from said buffer to a pending queue;

selecting fully aggregated packets from said pending queue or partially aggregated packets from said buffer depending on whether or not said pending queue is empty; and passing said selected packets to said network device.

2. A method according to claim 1 and also comprising indicating a reception status for said packets.

3. A method according to claim 1 and wherein said passing operates at a rate related to network congestion.

4. A method according to claim 3 and wherein said activity of said network device is affected by any one of the following: transmitter congestion, receiver congestion and congestion of network elements.

5. A method for a transmitting network device to minimally delay transmission of short messages, the method comprising:

aggregating in a buffer at least two small messages received from an upper layer of said transmitting network device into a packet;

providing fully aggregated packets from said buffer to a pending queue;

selecting fully aggregated packets from said pending queue or partially aggregated packets from said buffer depending on whether or not said pending queue is empty; and passing said selected packets to a network interface for transmission.

6. A method according to claim 5 and also comprising indicating a reception status for said packets.

7. A method according to claim 5 and wherein said activity of said network device is affected by any one of the following: transmitter congestion, receiver congestion and congestion of network elements.

* * * * *

UNITED STATES PATENT AND TRADEMARK OFFICE
CERTIFICATE OF CORRECTION

| | |
|---|---|
| PATENT NO. | : 7,613,115 B2 |
| APPLICATION NO. | : 10/699081 |
| DATED | : November 3, 2009 |
| INVENTOR(S) | : Carmeli et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 945 days.

Signed and Sealed this

Nineteenth Day of October, 2010

David J. Kappos
*Director of the United States Patent and Trademark Office*